(12) United States Patent
Stoeck et al.

(10) Patent No.: US 8,843,526 B2
(45) Date of Patent: Sep. 23, 2014

(54) APPLICATION SPECIFIC MEMORY CONSUMPTION AND ANALYSIS

(75) Inventors: Christoph Stoeck, Eppelheim (DE); Masoud Aghadavoodi Jolfaei, Wiesloch (DE); Ariane Buster-Zoeller, Bruehl (DE); Sven Kobler, Buettelborn (DE); Christian Stork, Boenen (DE); Doris Vielsack, Malsch (DE)

(73) Assignee: SAP AG, Walldorf (DE)

( * ) Notice: Subject to any disclaimer, the term of this patent is extended or adjusted under 35 U.S.C. 154(b) by 940 days.

(21) Appl. No.: 12/641,458

(22) Filed: Dec. 18, 2009

(65) Prior Publication Data

US 2011/0154236 A1    Jun. 23, 2011

(51) Int. Cl.
  *G06F 17/30* (2006.01)
  *G06F 9/44* (2006.01)
  *G06F 3/048* (2013.01)

(52) U.S. Cl.
  CPC .............. *G06F 3/048* (2013.01); *G06F 17/30* (2013.01)
  USPC .......................................... 707/798; 717/128

(58) Field of Classification Search
  USPC ................... 707/798, 803, 999.206; 717/128
  See application file for complete search history.

(56) References Cited

U.S. PATENT DOCUMENTS

| | | | |
|---|---|---|---|
| 7,725,505 B2* | 5/2010 | Bonev et al. | 707/814 |
| 8,176,475 B2* | 5/2012 | Kosche et al. | 717/127 |
| 8,321,430 B2* | 11/2012 | Zvi et al. | 707/754 |
| 8,468,502 B2* | 6/2013 | Lui et al. | 717/127 |
| 2006/0041661 A1* | 2/2006 | Erikson et al. | 709/225 |
| 2008/0162547 A1* | 7/2008 | Bonev et al. | 707/103 R |
| 2009/0327372 A1* | 12/2009 | Ylonen | 707/206 |
| 2009/0327377 A1* | 12/2009 | Ylonen | 707/206 |

OTHER PUBLICATIONS

Stefan Paal; Reiner Kammueller and Bernd Freisleben; Java Class Separation for Multi-Application Hosting; Proceedings of the 3rd Conference on Internet Computing (IC 2002); CSREA Press 2002 pp. 259-266 (http://netzspannung.org/about/mars/projects/pdf/awake-2002-2-en.pdf).

* cited by examiner

*Primary Examiner* — Jacob F Bétit
*Assistant Examiner* — Bao Tran

(57) ABSTRACT

Methods and systems are described that involve determining the memory consumption of a specific application. The memory analysis identifies the dynamic memory objects controlled by a particular application and the memory objects controlled by the framework running that application. A structured view of the memory objects of the framework with respect to the individual framework architecture is presented in combination with the application specific memory object graph. A resulting display, in the form of a dominator tree, allows detecting dependencies of the application to the framework and shows which part of the framework is responsible for keeping alive which part of the application. Moreover, the resulting structure shows memory consumption of a single element of the application including bound memory and object memory. Further, a user can identify the references and the dependencies among the memory objects.

19 Claims, 7 Drawing Sheets

US 8,843,526 B2

APPLICATION SPECIFIC MEMORY CONSUMPTION AND ANALYSIS

TECHNICAL FIELD

Embodiments of the invention generally relate to the software arts, and, more specifically, to methods and systems for application specific memory consumption and analysis.

BACKGROUND

In computing systems, memory analysis tools provide a user with the possibility to analyze memory shortages that source debuggers cannot detect. Moreover, they can help optimize long-term memory usage, thereby reducing Random Access Memory (RAM) requirements and ensuring that the system does not run out of memory for long periods after deployment. Even if a system appears to perform acceptably, a memory analysis tool can uncover hidden inefficiencies that when corrected, allow for substantial improvements in performance and memory usage. Sometimes it may be worthwhile to employ memory analysis tools, system profilers, and other system tracing tools throughout the entire development process. Not only will the user identify problems early (when the problems are much easier to correct), but this will also ensure that the system delivers all the features and performance that it is truly capable of supporting.

Memory analysis typically includes capturing memory-related events on the embedded target, importing that information into a development environment, and analyzing errors and areas that need optimization using a visualization tool.

SUMMARY

Methods and systems are described that involve application specific memory consumption and analysis. In one embodiment, the method includes creating a set of new nodes representing a semantic tree structure to a memory object graph, wherein the semantic tree structure includes a hierarchical organization of elements and is an appropriate representation of the application framework with respect to memory consumption. A subset of memory objects is identified from a plurality of memory objects contained in the memory object graph. Further, the subset of memory objects is assigned to the set of new nodes in the memory object graph and thus a new semantic graph is generated including the semantic tree structure with the newly assigned subset of memory objects. Finally, the semantic graph is transformed into a dominator tree and the dominator tree is displayed in a user interface element.

In one embodiment, the system includes an application module, the application module including a set of elements, wherein the elements are organized in a semantic tree representing a hierarchical structure. The system also includes a memory object graph stored in a memory unit, wherein the memory object graph is expanded by adding a set of new nodes corresponding to the semantic tree. Further, the system includes a framework that runs the application, wherein the framework identifies a group of memory objects in the memory object graph and assigns the identified group of memory objects to the set of new nodes. The framework generates a semantic graph from the semantic tree and the assigned group of memory objects. Finally, a display unit shows the semantic graph as a dominator tree structure and provides memory consumption information.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for application specific memory consumption and analysis are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Memory analysis of applications could be a quite complex process. Since more and more applications are controlled by certain frameworks (for example, Web services applications may be controlled by corresponding Web services framework), a detailed memory analysis should cover memory objects controlled by the application itself and at the same time with a number of memory objects created by the underlying framework that runs this application. In an embodiment, the memory objects created by the underlying framework are separated from the memory objects used by the application. Further, a memory analysis tool may provide a structured view on the memory objects of the framework contained in a memory object graph, with respect to the architecture of each individual framework, in combination with the application specific memory objects structure. A resulting display provides a possibility for detecting all dependencies from the application to the framework and show which part of the framework is responsible for supporting which part of the given application.

Figure 1:
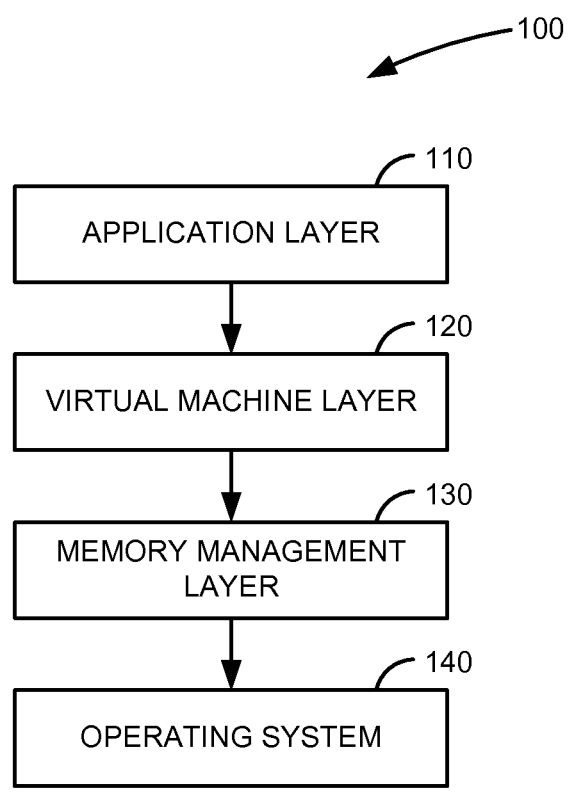
FIG. 1 is a diagram of an embodiment that illustrates memory consumption with respect to different software layers.

FIG. 1 is a diagram of an embodiment that shows memory consumption with respect to different software layers. Different memory analysis tools may provide different memory consumption values. In an embodiment, the software layers of a system are driven by the system's kernel, which contains a number of additional software layers and thus, there may be as many memory consumption values as layers of software that exist between an application and an operating system. As a result, it is not always easy to get the correct information about the memory consumption of the application itself. Therefore, to understand the meaning of the different memory consumption values, it is useful to have a look at the memory consumption with respect to the different software layers below the application layer. FIG. 1 at 100 shows memory consumption at various layers of a system. An application from application layer 110, deployed and running on a system, requests memory from virtual machine (VM) layer 120. The application layer 110 includes a number of deployed applications and a framework that runs the applications. The VM layer 120 provides the runtime and memory for the application layer 110 for performing application's functions (e.g., hosting of loaded programs containing fields, parameters, variables, dynamic memory objects, and so on). The VM layer 120 is located inside the kernel of the system and requests memory from a more basic software layer inside the kernel, memory management layer 130. The memory management layer 130 supplies memory to a number of kernel components including the VM of VM layer 120. The memory management layer 130 allocates the requested memory directly from resources of the operating system 140. The operating system 140 provides memory to the memory management layer 130.

Each layer in the hierarchical process 100 allocates memory from the layer below and provides memory to the layer above (when such layer exists). Usually, the entire amount of allocated memory is not provided to the next layer. Since memory allocation could be an expensive operation, frequent allocation requests should be avoided. Thus, a software layer may have algorithms implemented for a memory management sub-system with allocation strategy that satisfies frequent requests for a small amount of memory out of bigger chunks previously allocated. As memory is frequently freed and requested again, the memory management system has to search for appropriate chunks of memory. Often times, the recently freed chunk may not fit in the next request. This may lead to fragmentation of the managed memory. Further, a certain amount of memory may be needed for the administration in each software layer, which may depend on the amount of memory requested by the layer above. Thus, not all of the allocated memory may be provided to the next level. The memory assigned to each software layer of process 100 may be divided in two parts: used memory—amount of memory that is used by the current software layer; and allocated memory—amount of memory that is additionally allocated by the software layer located underneath the current layer due to own memory management algorithms, fragmentation, and alignment requirements.

The different software layers consume the memory via memory objects. Some of the memory objects are static, while others are dynamic. The static memory objects may include all global variables of all loaded programs in a system and all static attributes of all loaded classes of the programs. The dynamic memory objects include objects, of which instances can grow dynamically. For example, common objects such as class instances or strings, or specific objects such as anonymous data objects, internal tables, boxed components, etc. The anonymous data objects are dynamically (at runtime) created data objects such as simple fields, structures, internal tables, etc. An internal table is a dynamic array of a given line type including a structure with an arbitrary number of components, which can be simple types, structures, or again internal tables. Boxed components are implementations of structures, which can be used inside basic structures or classes; variables of boxed components point to structure values that can be shared. In an embodiment, the dynamic memory objects may have the following memory consumption values: object memory and bound memory. Object memory is the amount of memory that embraces the object itself, including all flat components (components with static size that can be stored in-place, no references to dynamic memory objects elsewhere) therein. For example, inside a class instance this is the sum of all flat attributes (or flat structures); inside an internal table this is the size of the sum of all flat components of the table line times the number of lines, The bound memory of an object is the object memory of the object itself plus the object memory of all objects bound to this object. The bound memory objects are those objects which are exclusively referenced (directly or indirectly) by a given memory object. Thus, the bound memory is that amount of memory that will be freed implicitly, if the given memory object is freed. For the object memory and bound memory consumption values, it is possible to distinguish which part of the value is used by the application and which part additionally contains the administrative data of the runtime framework for this particular memory object.

To analyze the memory consumption, the memory consumption values of the memory objects have to be calculated. However, calculating some of the memory consumption values may impose a performance penalty (i.e., it may not be possible to calculate the values frequently due to performance issues). This is due to the fact that the runtime framework of a system needs to walk through all memory objects, as part of a memory object graph, starting from the root memory object and continue to the referenced objects to determine the dependencies and calculate the memory consumption values of all memory objects. Depending on the number of memory objects involved and the complexity of the memory object graph, this procedure may take up to several seconds. Therefore, some memory consumption values are chosen for frequent and automatic determination of the current memory consumption, although they do not contain only application relevant memory, but may also contain kernel-internal administration data.

The number of memory objects, their dependencies and linkages may be needed to build the memory object graph. Some of the memory objects are dynamic—they are created dynamically during runtime of an application. In an embodiment, the nodes of the memory object graph includes the different types of dynamic objects including, but not limited to: strings; internal tables; boxes (boxed components); class instances; and anonymous data objects. The nodes of the memory object graph are linked to each other by the nodes edges. The root nodes are kept alive (e.g., not being subjected to garbage collection) even if they are not referenced by any other memory objects. The memory object graph may be a complicated structure of nodes sometimes making it difficult to display the complete memory object graph on one screen. Some techniques display a part of the graph starting with one particular memory object, thus, this part of the graph would represent a tree of memory object dependencies; it can be displayed in both directions: referenced nodes (children) and referencing nodes (parents).

Figure 2:
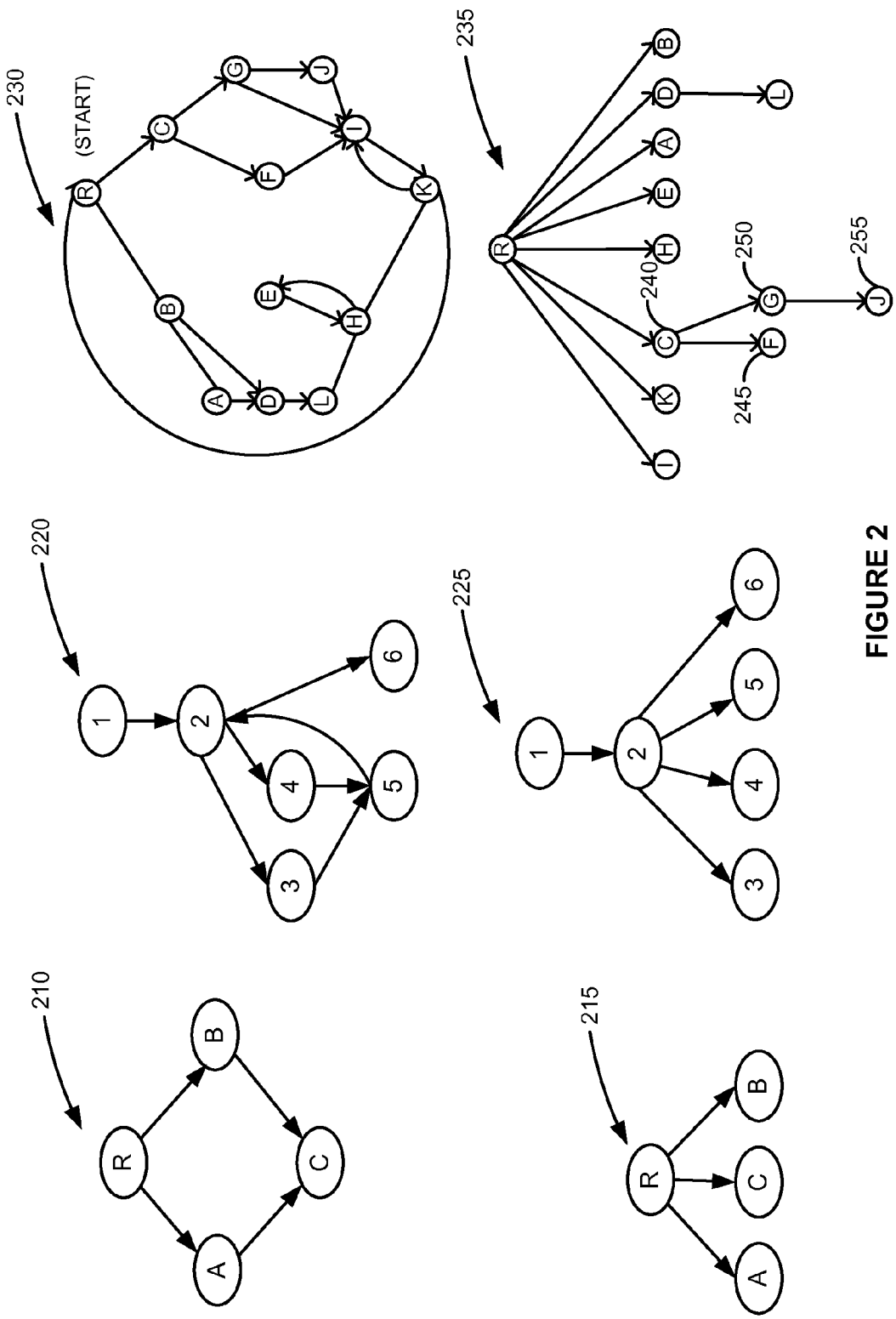
FIG. 2 illustrates a set of example transformations of a memory object graph into a dominator tree.

In an embodiment, the memory object graph may be transformed into a dominator tree. A dominator tree may be built on the basis of the memory object graph. FIG. 2 shows a set of examples of transforming a memory object graph into a dominator tree. The upper part of FIG. 2, including structures 210, 220, and 230, shows examples of memory object graphs. The lower part of FIG. 2, including structures 215, 225, and 235, shows examples of dominator trees corresponding to the graphs 210, 220, and 230 respectively. Each object in the dominator tree is responsible for keeping its children alive, thus it may also be called a "keep-alive" tree. Further, in the dominator tree one object dominates a second object, if all paths from the roots to the second object run through the first object. For example, in dominator tree 235, object C 240 dominates objects F 245, G 250, and J 255.

Transforming an object graph into a dominator tree provides functionality such as: fast and easy calculation of the bound memory of an object by summing the object memory of all children nodes; fast and easy identification of any memory object by going through the tree, wherein the tree represents a compact version of the object graph. Further, the dominator tree provides: an easy way to find all depending memory objects (i.e., memory objects that are kept alive by one root object); easy identification of the root objects; easy identification of those memory objects, which are not essential anymore; and easy identification of those references to be deleted inside the application program to allow garbage collector to free the memory objects and thus lower the memory footprint of the application. The dominator trees can be used in memory consumption analysis for identification of memory consuming objects and the associated dominated objects therein. This could help to decide which objects can be deleted to save memory. Also, exact amount of memory to be saved could by provided by identification of the dominated memory objects, which will be deleted implicitly, if a specific memory object is deleted.

In an embodiment, memory consumption analysis includes providing information for the memory consumption of a specific application. The information may regard each entity (or a component) of an application and may include, but is not limited to: a list of depending memory objects; the sum of memory consumption of depending memory objects; and identification of the memory objects showing if an object belongs to the application or to the framework that runs the application.

Figure 3A:
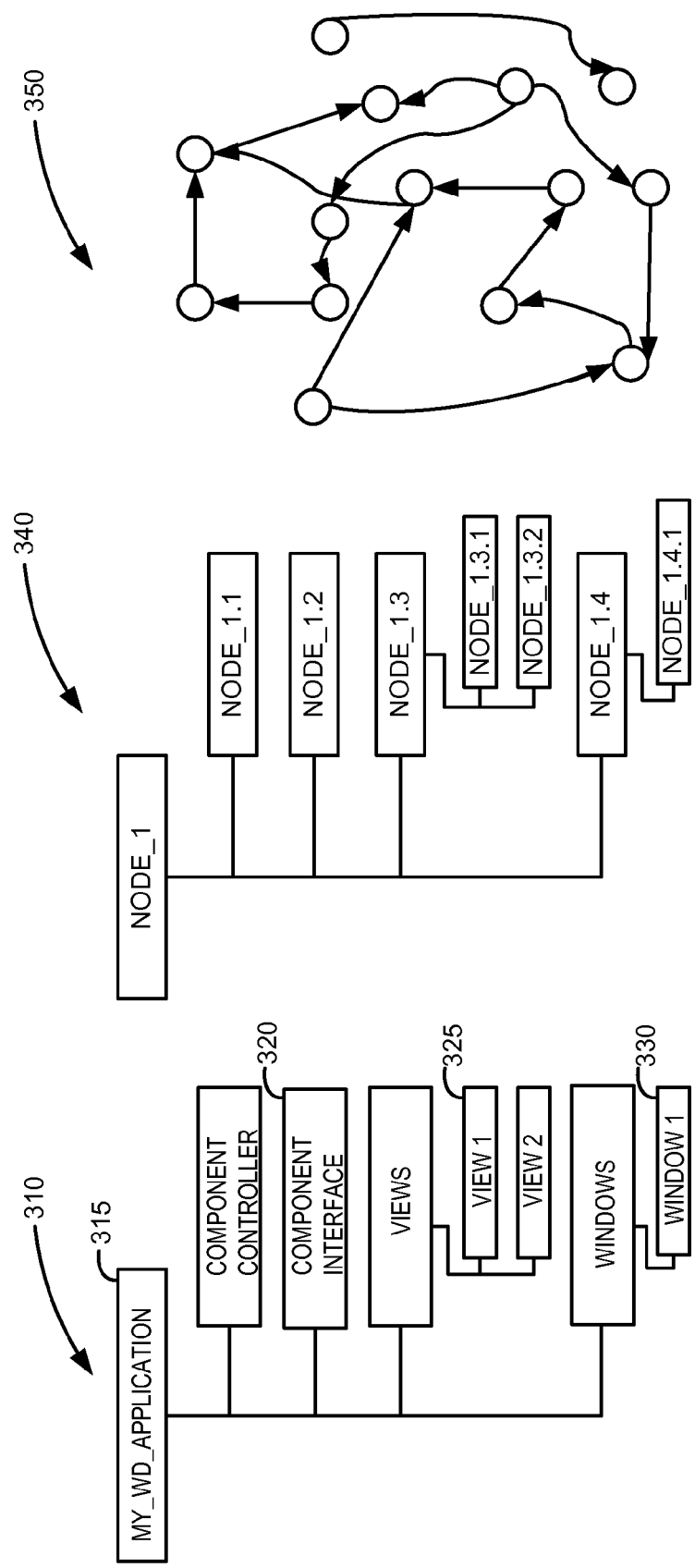
FIG. 3A is a diagram of an embodiment of a method for building a semantic tree hierarchy of memory objects.

FIG. 3A is a diagram of an embodiment of a method for building a semantic tree hierarchy of memory objects. A semantic tree hierarchy may include structured logical entities represented by nodes and their edges that each framework (or application) defines in order to represent the current status/context of the framework running the application. The logical nodes may or may not contain memory objects. If the logical nodes contain memory objects, the memory objects' edges are overruled by the logical nodes structure, meaning the edges of the logical nodes.

As an example, structure 310 represents a hierarchy containing a number of elements provided with application 315. In an embodiment, application 315 may be a Web modeling tool for user interfaces (e.g., view1 325 and window1 330) that provides support when developing Web representation of business applications. The elements of the application may be reusable. Application 315 includes a number of elements including, but not limited to, a component interface 320 (e.g., for defining how a user can interact with an application), a view1 325 (e.g., for describing the layout and behavior of a rectangular area of a user interface), a window1 330 (e.g., for grouping together multiple views and view sets), and so on. Hierarchy 340 is a logical structure of nodes in the form of a semantic tree that represents the structural organization of the application 315 with respect to the specific framework running application 315. During runtime of the application 315, a memory object graph 350 is created containing runtime data for framework and application.

The memory object graph 350 contains all memory objects needed for the application 315 and for the underlying framework. During runtime, the semantic tree 340 is not explicitly given, but expresses implicitly the current status/context of the framework running the application. When it comes to memory analysis, a memory analysis tool calls a framework specific functionality (framework call-back), which analyzes the current status/context of the framework. This can be done either within a live analysis of a running application at a certain execution point or on the basis of an arbitrary memory snapshot after the execution. Live analysis may be done by debugging of the application. In this case, the application is stopped inside a debugger tool. The framework call-back is then implemented for the memory analysis tool inside the debugger and may use a debugger application programming interface (API) to analyze the status/context. In another embodiment, the framework call-back can operate on a memory snapshot, which then needs to contain all the framework specific information for building the semantic tree. The framework call-back is in this case implemented inside a stand-alone memory analyzing tool, using another API dealing with the memory snapshot.

Figure 3B:
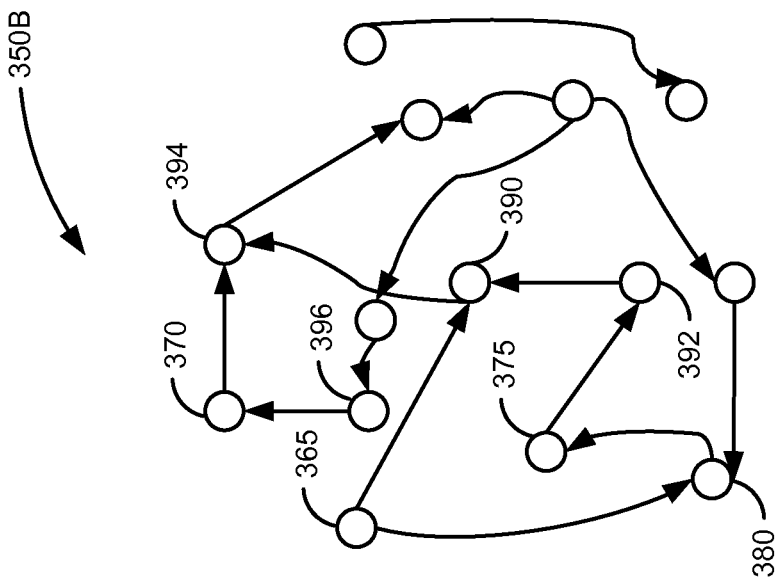
FIG. 3B is a diagram of an embodiment of a method for identifying memory objects to assign to the semantic tree nodes.
Figure 3B:
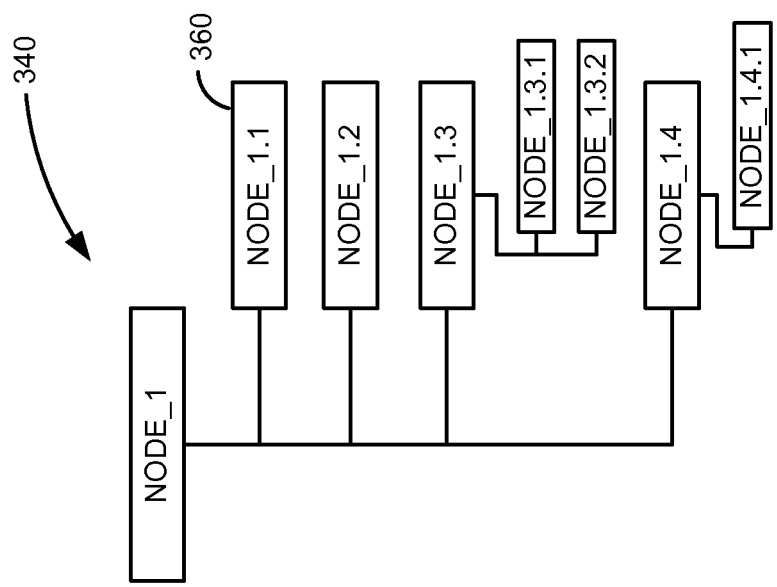

FIG. 3B is a diagram of an embodiment of a method for identifying memory objects to assign to the semantic tree nodes. During analyzing the current status/context of the framework, the framework call-back creates the semantic tree explicitly, using an API of the memory analysis tool. In case of a live analysis, the memory analysis tool's interface may not allow the framework call-back to modify the original memory object graph 350 (which may harm the context being debugged in the debugger case). Instead, the memory analysis tool creates a new graph with cloned memory objects (copies) from the original graph 350 as a copy version of the original memory object graph (MOG) 350 and provides it to the framework call-back functionality. In an alternative embodiment the copied memory object graph contains information about the identification, type and memory consumption of the memory objects and their relationships (edges) only, to save memory. Thus, by using copies of the memory objects from the MOG 350, the framework call-back does not modify the original MOG 350.

Further, during status/context analysis, the framework call-back checks the framework metadata to decide which memory objects from copied MOG 350B to be assigned to the nodes of the semantic tree 340. A semantic group of one or more memory objects can be assigned to a given semantic tree node. For example, the framework call-back identifies that memory objects 365, 370, and 375 are needed for node 360. The identification of the memory objects is framework-dependent, that is, the needed memory objects are selected based on the context of a given framework.

Figure 3C:
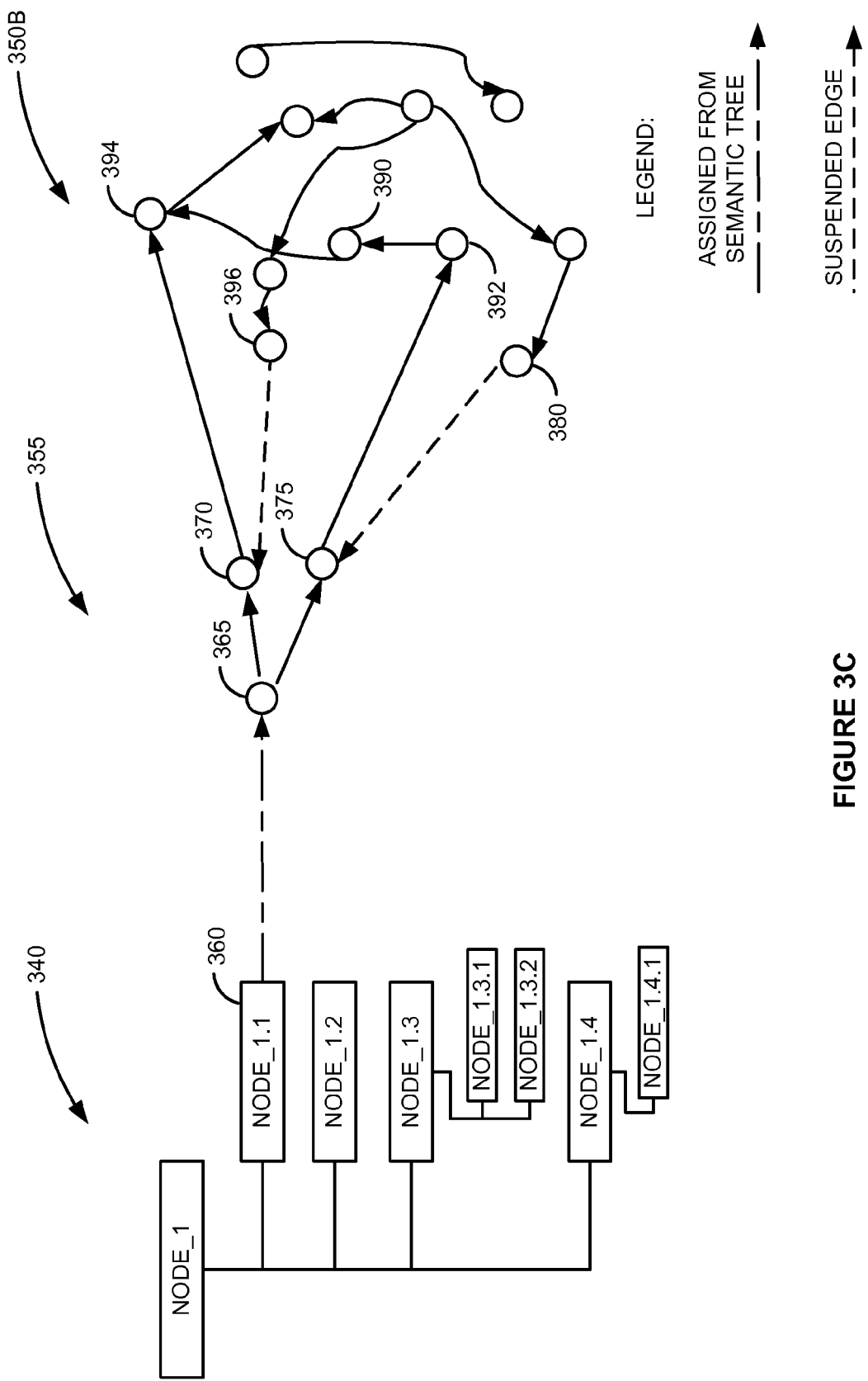
FIG. 3C is a diagram of an embodiment of a method for assigning identified memory objects to the semantic tree nodes.

FIG. 3C is a diagram of an embodiment of a method for assigning identified memory objects to the semantic tree nodes. The identified memory objects 355 of copied MOG 350B may have references to other memory objects in the copied MOG 350B. For example, memory object 365 has references to memory objects 380 and 390. The framework call-back has to decide, which of the edges of the identified memory objects that point to and from other memory objects in the copied MOG 350B have to be suspended to generate a proper and meaningful new graph, in which the semantic tree should be the root part.

The copied MOG 350B (and the original MOG 350) may be a directed graph (a graph with edges that point in one direction) or an undirected graph. In a directed memory object graph, both directions for the edges of the identified memory objects (pointing from and to the identified memory objects) can be suspended. The framework call-back of a given application decides which edges of which direction to be suspended. In an embodiment, the direction of the edges pointing from the other memory objects in the original graph to the identified memory objects is suspended. In FIG. 3C memory objects 365, 370 and 375 are identified by the framework call-back. Edges to memory objects 365 and 370 from other memory objects of the MOG 350B are suspended and memory object 365 is assigned directly to node 360 of the semantic tree. For example, the references from memory objects 396 and 380 to memory object 370 and 375 respectively, are suspended, while the references from memory objects 370 and 375 to memory objects 394 and 392 remain unsuspended. In an embodiment, just some of the identified memory objects are assigned; in alternative embodiment, all identified memory objects are assigned. The framework call-back functionality decides which of the identified memory objects 365, 370, and 375 to be directly dependent from the semantic tree nodes and which indirectly dependent (i.e., to be dependent from the directly dependent memory objects. For example, memory objects 365 depends directly from node 360 and memory objects 370 and 375 depend from memory object 365. After the assignment is performed for all nodes of the semantic tree, a new semantic graph is formed with the semantic tree nodes as root nodes and the memory objects as representatives of the original object graph 350 with suspended edges and new assigned edges to the semantic nodes.

In an embodiment, the new semantic graph is transformed into a dominator tree and all functions of the dominator tree can be used. The nodes of the semantic tree are integrated as root nodes of the dominator tree and the direct and indirect memory objects are organized as framework memory objects (e.g., memory objects that belong to and are used by the underlying framework), dominating the rest of the memory objects from the memory object graph. Using the dominator tree, a user can easily identify how much memory consumption is associated with a specific node or calculate the bound memory of an object. For example, a user can identify: how much memory view1 325 element of application 315 consumes; which dependent memory objects are used by the framework; which dependent memory objects are used by the application 315, and so on.

Figure 4:
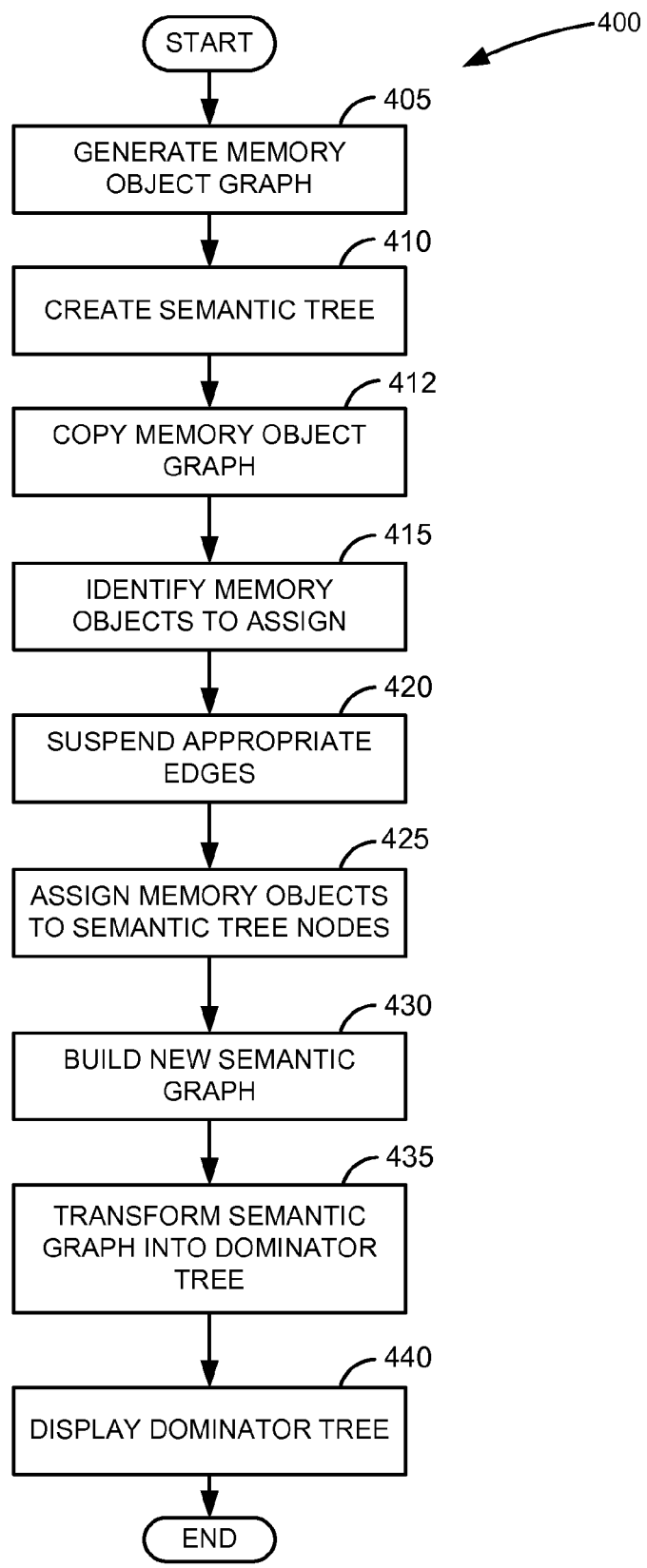
FIG. 4 is a flow diagram of an embodiment of a method for generating a semantic tree inside a memory object graph and displaying memory consumption results.

FIG. 4 is a flow diagram of an embodiment for generating a semantic tree inside a memory object graph and displaying memory consumption results. In an embodiment, during runtime of an application, a memory object graph is generated at block 405. The memory object graph (MOG) contains a plurality of memory objects including their references (edges) and dependencies among each other. At block 410, new semantic nodes are created. The new nodes correspond to the structural nodes of a semantic tree of the framework running the application. The semantic tree represents a hierarchical organization of the elements of the framework. The semantic tree is framework specific and thus is provided by an implementation of the framework (framework call-back). At block 412, the memory object graph with all memory objects are copied. At block 415, a set of memory objects from the copied MOG are identified as memory objects to be assigned to the nodes of the semantic tree. The set of memory objects represents a set of cloned (copied) memory objects from the original memory object graph. At block 420, for each memory object to be assigned, the appropriate edges to other memory objects are suspended to yield a proper and meaningful new graph. At block 425 the identified memory objects are assigned to the semantic tree nodes. At block 430, a new semantic graph is built in response to assigning the identified memory objects to the corresponding semantic tree nodes. The resulting semantic graph does not affect the original memory object graph and contains clones or representatives of the original memory objects.

At block 435, the resulting semantic graph is transformed into a dominator tree structure. In an embodiment, the dominator tree is displayed in a user interface component, at block 440. The dominator tree shows the nodes of the tree corresponding to elements of application 315. Further, the dominator tree shows memory consumption for each particular element of the application 315. Since the complete tree is a dominator-like representation, the referenced memory objects are represented in a keep-alive tree as the lower tree levels may be unfolded. More levels can be unfolded to show the memory objects that belong to the application and the memory objects that belong to the framework. There may be memory objects lying on the same level as the root application node, those objects cannot be assigned to any single application element node below the root node, but are used by at least two of the application elements' nodes located on the same level. Further information may be provided regarding all references of the listed memory objects, including their bound memory (used and allocated) and the object memory (used and allocated).

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable medium as instructions. The term "computer readable medium" should be taken to include a single medium or multiple media that stores one or more sets of instructions. The term "computer readable medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 5:
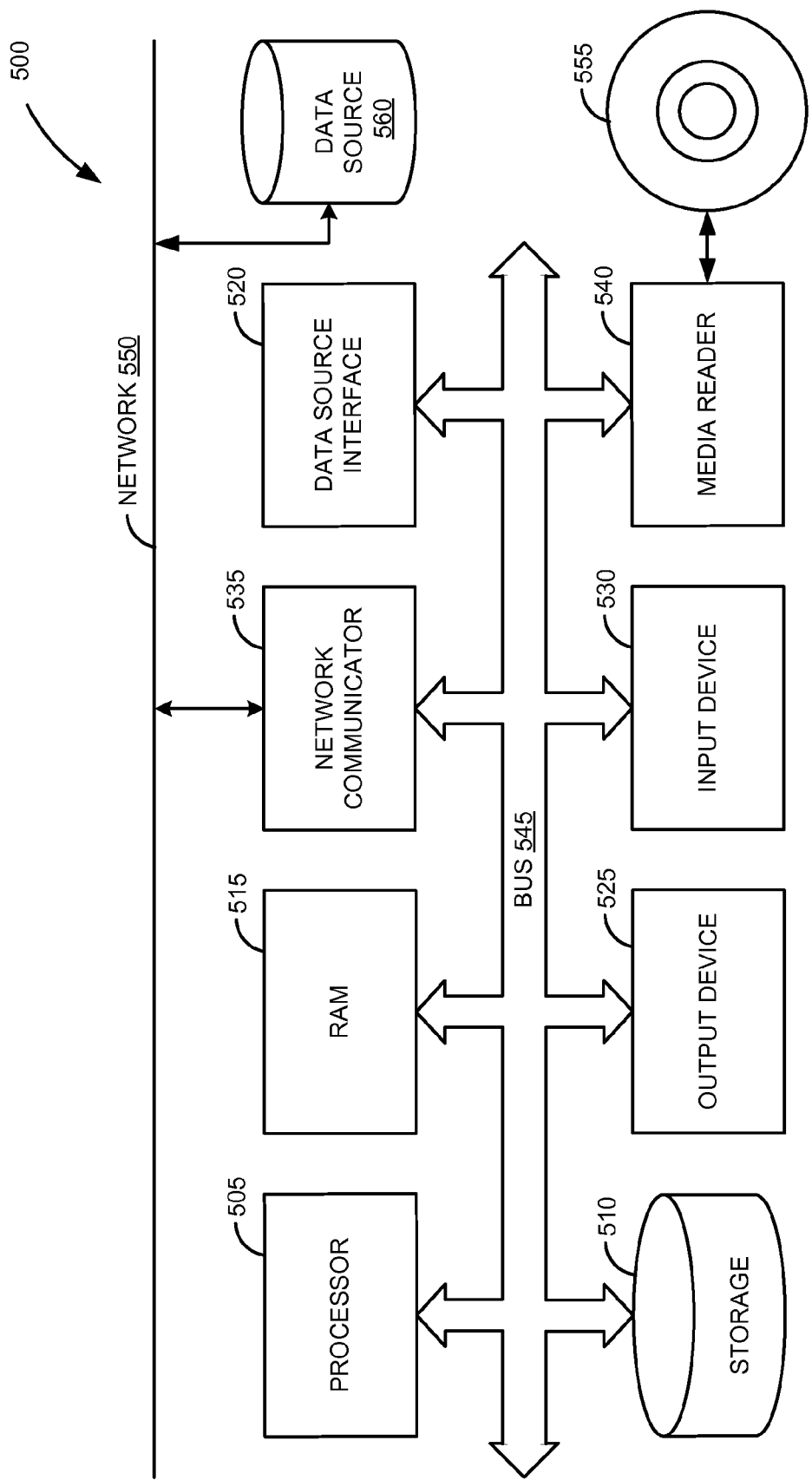
FIG. 5 is a block diagram of an exemplary computer system 500.

FIG. 5 is a block diagram of an exemplary computer system 500. The computer system 500 includes a processor 505 that executes software instructions or code stored on a computer readable medium 555 to perform the above-illustrated methods of the invention. The computer system 500 includes a media reader 540 to read the instructions from the computer readable medium 555 and store the instructions in storage 510 or in random access memory (RAM) 515. The storage 510 provides a large space for keeping static data where at least some instructions could be stored for later execution. The stored instructions may be further compiled to generate other representations of the instructions and dynamically stored in the RAM 515. The processor 505 reads instructions from the RAM 515 and performs actions as instructed. According to one embodiment of the invention, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. Each of these output 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be access via one or more abstraction layers implemented in hardware or software. For example, the data source 560 may be access by network 550. In some embodiments the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

The invention claimed is:

1. A non-transitory computer-readable storage medium tangibly storing computer-readable instructions thereon, which when executed by the computer, cause the computer to perform operations comprising:
   generating a memory object graph comprising a plurality of memory objects, the memory objects comprising runtime data for an application framework that runs an application and for the application;
   creating a semantic tree structure defining context of the application framework with a set of new nodes that represent hierarchical elements of the application framework;
   defining a first set of memory objects from the plurality of memory objects that are related to the application framework and a second set of memory objects from the plurality of memory objects that are related to the application;
   based on the context of the application framework, identifying one or more memory objects from the first set of memory objects related to the application framework required by a node from the semantic tree structure;
   determining a set of edges from edges in the memory object graph between the first set of memory objects and the second set of memory objects by removing an edge from the edges in the memory object graph between a first memory object in the identified one or more memory objects and a second memory object from the second set of memory objects, wherein a second edge connects a third memory object from the second set of memory objects and the first memory object;
   assigning the identified one or more memory objects to the node from the set of new nodes in the semantic tree structure to generate a semantic graph for detecting dependencies between the application framework and the application; and
   generating the semantic graph that includes the semantic tree structure in root part, the memory objects, relationships based on the assigning between the semantic tree structure and the first set of memory objects related to the application framework, and the determined set of edges between the first set of memory objects and the second set of memory objects related to the application.

2. The computer-readable storage medium of claim 1, wherein the operations further comprise transforming the semantic graph into a dominator tree.

3. The computer-readable storage medium of claim 2, wherein the operations further comprise displaying the dominator tree in a user interface element.

4. The computer-readable storage medium of claim 3, wherein displaying the dominator tree comprises:
  displaying memory consumption for a single element of the application framework;
  displaying which memory objects from the plurality of memory objects are used by an application; and
  displaying which memory objects from the plurality of memory objects are used by the application framework running the application.

5. The computer-readable storage medium of claim 4, wherein transforming the semantic graph further comprises designating a node of the semantic graph as a root node in the dominator tree.

6. The computer-readable storage medium of claim 4, wherein the operations further comprise identifying if a memory object is linked to another memory object.

7. The computer-readable storage medium of claim 4, wherein the operations further comprise:
  identifying bound memory of a memory object; and
  identifying object memory of the memory object.

8. A computer implemented method comprising:
  generating a memory object graph comprising a plurality of memory objects, the memory objects comprising runtime data for an application framework that runs an application and for the application;
  creating a semantic tree structure defining context of the application framework with a set of new nodes that represent hierarchical elements of the application framework;
  defining a first set of memory objects from the plurality of memory objects that are related to the application framework and a second set of memory objects from the plurality of memory objects that are related to the application;
  based on the context of the application framework, identifying one or more memory objects from the first set of memory objects related to the application framework required by a node from the semantic tree structure;
  determining a set of edges from edges in the memory object graph between the first set of memory objects and the second set of memory objects by removing an edge from the edges in the memory object graph between a first memory object in the identified one or more memory objects and a second memory object from the second set of memory objects, wherein a second edge connects a third memory object from the second set of memory objects and the first memory object;
  assigning the identified one or more memory objects to the node from the set of new nodes in the semantic tree structure to generate a semantic graph for detecting dependencies between the application framework and the application; and
  generating the semantic graph that includes the semantic tree structure in root part, the memory objects, relationships based on the assigning between the semantic tree structure and the first set of memory objects related to the application framework, and the determined set of edges between the first set of memory objects and the second set of memory objects related to the application.

9. The method of claim 8, further comprising transforming the semantic graph into a dominator tree.

10. The method of claim 9, further comprising displaying the dominator tree in a user interface element.

11. The method of claim 10, wherein displaying the dominator tree comprises:
  displaying memory consumption for a single element of the application framework;
  displaying which memory objects from the plurality of memory objects are used by an application; and
  displaying which memory objects from the plurality of memory objects are used by the application framework running the application.

12. The method of claim 9, wherein transforming the semantic graph further comprises designating a node of the semantic graph as a root node in the dominator tree.

13. The method of claim 11, further comprising identifying if a memory object is linked to another memory object.

14. The method of claim 11, further comprising:
  identifying bound memory of a memory object; and
  identifying object memory of the memory object.

15. A computing system comprising:
  a processor; and a memory in association with the processor storing instructions related to:
  an application module, the application module including a set of elements, wherein the elements are organized in a semantic tree structure defining context of an application framework running an application, and wherein the semantic tree structure comprises a set of new nodes that represent hierarchically the elements;
  a memory object graph stored in a memory unit, wherein the memory object graph comprises a plurality of memory objects, the memory objects comprising runtime data for the application framework and for the application;
  the application framework executing the application, wherein the application framework:
  defines a first set of memory objects from the plurality of memory objects that are related to the application framework and a second set of memory objects from the plurality of memory objects that are related to the application;
  based on the context of the application framework, identifies one or more memory object from the first set of memory objects related to the application framework required by a node from the semantic tree structure;
  determines a set of edges from edges in the memory object graph between the first set of memory objects and the second set of memory objects by removing an edge from the edges in the memory object graph between a first memory object in the identified one or more memory objects and a second memory object from the second set of memory objects, wherein a second edge connects a third memory object from the second set of memory objects and the first memory object; and
  assigns the identified one or more memory objects to a node from the set of new nodes, wherein as a result a semantic graph is created for detecting dependencies between the application framework and the application; and generates the semantic graph that includes the semantic tree structure in root part, the memory objects, relationships based on the assigning between the semantic tree structure and the first set of memory objects related to the application framework, and the determined set of edges between the first set of memory objects and the second set of memory objects related to the application.

16. The system of claim 15, further comprising a memory analysis tool that transforms the semantic graph into the dominator tree structure.

17. The system of claim 15, wherein the memory consumption information includes memory consumption of a single element of the application.

18. The system of claim 15, wherein a node of the semantic graph is displayed as a root node in the dominator tree.

19. The system of claim 15, further comprising a display unit that displays the semantic graph as a dominator tree structure and provides memory consumption information that shows which memory objects the memory object graph are used by the application and which memory objects are used by the framework.

* * * * *